US012116550B2

(12) United States Patent
Vaes et al.

(10) Patent No.: US 12,116,550 B2
(45) Date of Patent: Oct. 15, 2024

(54) PROCESS OF MAKING A LIQUID CONDITIONING COMPOSITION

(71) Applicant: The Procter & Gamble Company, Cincinnati, OH (US)

(72) Inventors: Dries Vaes, Houtvenne (BE); Ilse Maria Cyrilla D'Haeseleer, Dendermonde (BE); Vincenzo Guida, Woluwe Saint Pierre (BE)

(73) Assignee: The Procter & Gamble Company, Cincinnati, OH (US)

( * ) Notice: Subject to any disclaimer, the term of this patent is extended or adjusted under 35 U.S.C. 154(b) by 211 days.

(21) Appl. No.: 17/337,973

(22) Filed: Jun. 3, 2021

(65) Prior Publication Data

US 2021/0380904 A1 Dec. 9, 2021

(30) Foreign Application Priority Data

Jun. 3, 2020 (EP) .................................... 20178023

(51) Int. Cl.

| | |
|---|---|
| *C11D 3/00* | (2006.01) |
| *C11D 1/66* | (2006.01) |
| *C11D 1/72* | (2006.01) |
| *C11D 1/825* | (2006.01) |
| *C11D 3/30* | (2006.01) |
| *C11D 3/50* | (2006.01) |
| *C11D 17/00* | (2006.01) |

(52) U.S. Cl.

CPC ............ *C11D 3/0015* (2013.01); *C11D 1/825* (2013.01); *C11D 3/30* (2013.01); *C11D 3/50* (2013.01); *C11D 17/0017* (2013.01); *C11D 1/667* (2013.01); *C11D 1/72* (2013.01); *C11D 1/721* (2013.01); *C11D 2111/12* (2024.01)

(58) Field of Classification Search

CPC ............................ C11D 1/825; C11D 17/0017

See application file for complete search history.

(56) References Cited

U.S. PATENT DOCUMENTS

| | | | | |
|---|---|---|---|---|
| 5,288,423 | A * | 2/1994 | Behan | C11D 3/505 516/900 |
| 5,447,644 | A | 9/1995 | Guenin et al. | |
| 2002/0010104 | A1 | 1/2002 | Ewbank et al. | |
| 2014/0364356 | A1* | 12/2014 | Corona, III | B01F 33/821 510/527 |
| 2018/0353914 | A1* | 12/2018 | Ng | C11D 3/0089 |

FOREIGN PATENT DOCUMENTS

| | | | |
|---|---|---|---|
| EP | 0466235 | A1 | 1/1992 |
| WO | 2000032153 | A1 | 6/2000 |
| WO | 2005123028 | A1 | 12/2005 |
| WO | 2009036277 | A2 | 3/2009 |
| WO | 2018223325 | A1 | 12/2018 |
| WO | 2018223368 | A1 | 12/2018 |

OTHER PUBLICATIONS

Chemical Book (https://www.chemicalbook.com/ProductChemicalPropertiesCB2325608_EN.htm) accessed Feb. 24, 2023 (Year: 2023).*

15808F Extended EP Search Report and Written Opinion for 20178023.6 dated Nov. 13, 2020, 09 pages.

* cited by examiner

*Primary Examiner* — Peter F Godenschwager

(74) *Attorney, Agent, or Firm* — Andrew J. Mueller; Gregory S. Darley-Emerson

(57) ABSTRACT

Processes for making a liquid conditioning composition, for example by using a first feedstock composition that includes perfume.

15 Claims, 2 Drawing Sheets

PROCESS OF MAKING A LIQUID CONDITIONING COMPOSITION

FIELD OF THE INVENTION

The present disclosure relates to processes for making a liquid conditioning composition, for example by using a first feedstock composition that includes perfume.

BACKGROUND OF THE INVENTION

Manufacturers of liquid consumer products often create products in a batch process, whereby a large quantity of a product composition is made and then provided by filling nozzles to the containers in which the product will be sold. While effective for mass-produced products, the process has little flexibility for variation from one container to the next.

Such products may also be made by in-line mixing processes, for example where various ingredients are added to a base composition flowing through a pipe to create differentiated products. However, such processes may require clean-out steps between runs of different products to avoid contamination, resulting in lost production time.

In order to provide greater flexibility to the manufacturer, and even customization opportunities for the consumer, it can be advantageous to add separate product ingredients directly to the container in which the product will be sold. For example, a first perfume mixture can be added to one container, while a second perfume mixture can be added to a second container, resulting in two different products made back-to-back on the same line, without requiring down-time to clean the pipes.

However, ensuring that the components added to the container are sufficiently mixed to provide a stable product can be a challenge. In particular, mixing perfumes, which typically include hydrophobic oils, into an aqueous conditioning product that also includes a cationic conditioning ingredient, such as a quaternary ammonium alkyl compound, often leads to stability challenges, as the composition may phase separate. It is further known that perfumes may be added to consumer product base compositions as a high internal phase oil-in-water emulsion with relatively small droplet sizes, but it has been found that such emulsions do not disperse easily in the container when the final product is made via a mix-in-container process; such emulsions are often viscoelastic and can stick to the interior walls of the container.

While the flow and momentum resulting from the addition of the liquid ingredients to the container can in part help with the mixing process, the flow rate and/or shear rate are typically less than would be experienced in a batch or in-line mixing process, in part to carefully control the volumes provided to the container. As an alternative or additional mixing step, the container may be externally agitated, for example, by shaking, but such steps can add cost, space, and time to the manufacturing process.

There is a need for efficient processes of making stable, perfumed liquid conditioning compositions in a container.

SUMMARY OF THE INVENTION

The present disclosure relates to processes for making liquid compositions in containers.

For example, the present disclosure relates to a process for making a liquid conditioning composition, the process including the steps of: providing a container with an interior space having a volume of from about 100 mL to about 10 L; providing a first feedstock composition to the interior space of the container, where the first feedstock composition includes an emulsion, the emulsion including perfume, an emulsifying agent, and water, where the weight ratio of the perfume to the emulsifying agent is at least 5:1; and providing a second feedstock composition to the interior space of the container, where the second feedstock composition includes a quaternary ammonium alkyl compound, where providing the second feedstock composition occurs concurrently and/or subsequently to providing at least a portion of the first feedstock composition to the interior space of the container.

The liquid conditioning composition may be a liquid fabric enhancer.

BRIEF DESCRIPTION OF THE DRAWINGS

The figures herein are illustrative in nature and are not intended to be limiting.

DETAILED DESCRIPTION OF THE INVENTION

Figure 1:
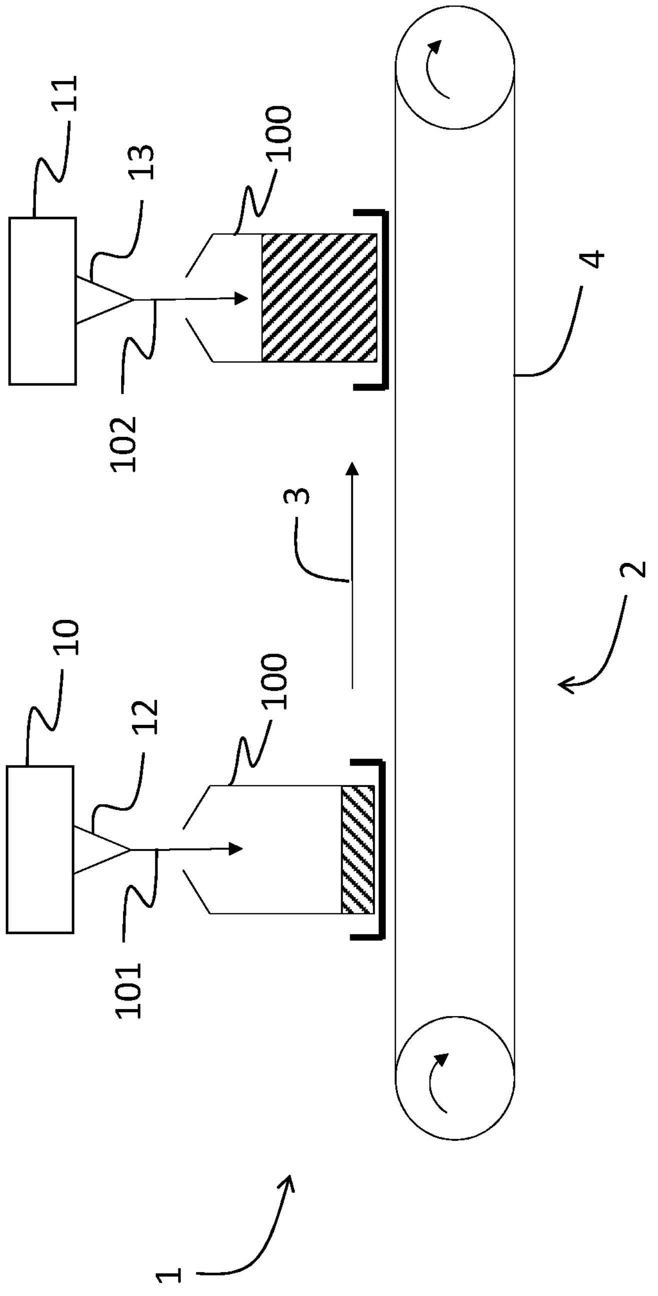
FIG. 1 shows an exemplary manufacturing system as described in the present disclosure.

The present disclosure relates to a process of making a perfumed liquid conditioning composition. The components may be directly added to a relatively small container, which may be capable of being sold to and used by a consumer. By carefully selecting the components and/or properties of a perfume emulsion, the perfume can efficiently and stably be incorporated into the liquid product, for example at the low shear rates of addition and/or without additional external mixing steps.

More specifically, and without wishing to be bound by theory, it is believed that providing the perfume as a water-in-oil (W/O) macroemulsion facilitates efficient incorporation into a base composition that contains a cationic component. While W/O macroemulsions are typically unstable and may generally be disfavored for this reason, in the present processes the instability works to the manufacturer's advantage. For example, it is believed that the physical instability facilitates catastrophic changes in the emulsion when combined with the aqueous base composition, resulting in efficient mixing, even at relatively low shear rates.

The processes, components, and compositions of the present disclosure are discussed in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein the phrase "fabric care composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

As used herein, the term "in situ" refers to real-time mixing that occurs inside a container (e.g., a bottle or a pouch) that is designated for housing a finished liquid consumer product (e.g., a liquid laundry detergent, a liquid fabric care enhancer, a liquid dish-wash detergent, a liquid hard-surface cleaner, and the like) during shipping and commercialization of such product, or even during usage after such product has been sold. In situ mixing of the present invention is particularly distinguished from the in-line mixing that occurs inside one or more liquid pipelines that are positioned upstream of a container, and preferably upstream of the filling nozzle(s). In situ mixing is also distinguished from the batch mixing that occurs inside one or more mixing/storage tanks that are positioned upstream of the liquid pipelines leading to a container suitable for selling or using.

As used herein, "feed composition" and "feedstock composition" are used interchangeably, unless indicated otherwise.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Process of Making a Liquid Conditioning Composition

The present disclosure relates to a process of making a liquid conditioning composition by combining at least two feedstock compositions in a container. The process and components are described in more detail below.

The processes of the present disclosure may take place on a single manufacturing system. An exemplary manufacturing system 1 is shown in FIG. 1. The manufacturing system 1 may include a conveyor system 2, which may be capable of moving a container 100 in a machine direction 3. The conveyor system 2 may include a belt, a track, or other suitable system 4 capable of moving the container(s). The manufacturing system 1 may comprise a linear synchronous motor (LSM) based system that facilitates propulsion of vehicles, which may hold the containers, along the track using electromagnetic force (EMF). The manufacturing system 1 may comprise a system in which the vehicles are propelled in some other manner, such as by individual servo motors. The container(s) 100 may follow a single preset path on the system. The manufacturing system 1 may provide multiple and/or variable paths for the containers. For example, a path may lead to certain filling stations but not others.

The manufacturing system 1 may include a plurality of filling stations 10, 11. A filling station 10, 11 may include one or more nozzles through which one or more compositions may be dispensed into a container. Typically, one nozzle will be associated with one composition. For example, a first liquid feed composition 101 may be provided via a first nozzle 12 to a container 100 at a first filling station 10. A second liquid feed composition 102 may be provided via a second nozzle 13 to the container 102 at a second filling station 11. Certain nozzles may allow for simultaneous provision of more than one composition. A filling station may also include multiple nozzles, each of which may provide a composition to a container, either simultaneously or in sequence.

A container 100 may stop at one, preferably only at some, or even all of the filling stations 10, 11 of the manufacturing system. Requiring the container to stop at only some of the filling stations allows for greater formulation flexibility, meaning that multiple types of consumer products may be manufactured on the same manufacturing system, even simultaneously—one container may go to certain filling stations and/or be filled with certain compositions, while a second container may go to different filling stations and/or be filled with different compositions.

The first liquid feed composition 101 may be provided at one or more filling stations. The first liquid feed composition 101 may be provided by one or more nozzles. The first liquid feed composition 101 may be provided at two or more filling stations, and/or by two or more nozzles.

The second liquid feed composition 102 may be provided at one or more filling stations. The second liquid feed composition 102 may be provided by one or more nozzles. The second liquid feed composition 102 may be provided at two or more filling stations, and/or by two or more nozzles.

At any given filling station, the filling time, for example when the second liquid feed composition is provided to the container, may range from about 0.1 second to about 20 seconds, or from about 0.5 to about 10 seconds, or from about 0.5 to about 5 seconds, preferably from about 0.5 second to about 4 seconds, and more preferably from about 1 second to about 3 seconds. Typically, faster times may be preferred for efficiency, and/or a certain minimum of filling time may be desired to improve accuracy of placement and/or volume provided.

Material, such as the first and second liquid feed compositions 101, 102, may be provided to the container 100 at a limited number of filling stations and/or by a limited number of nozzles. It may be desirable to limit the number of filling stations and/or nozzles to balance formulation flexibility against manufacturing complexity. Material may be provided to the container at a total of from 2 to 10, or from 2 to 8, or from 2 to 6, filling stations. Material may be provided to the container via a total of from 2 to 10, or from 2 to 8, or from 2 to 6, nozzles.

One or more of the nozzles may be connected to one or more flow-controlling devices for controlling the flow rates of one or more liquid flows generated by the nozzles. The one or more flow-controlling devices may be selected from the group consisting of valves, pistons, servo-driven pumps, and combinations thereof. The one or more flow-controlling devices may comprise one or more servo-driven pumps.

The first and/or second liquid feed compositions may be provided with a dynamic flow profile. The dynamic flow profiles are preferably mass-dependent, volume-dependent, and/or time-dependent, and may include: (a) a ramping-up section, which is defined by an increasing flow rate of the liquid feed at the beginning of a filling step; and/or (b) a ramping-down section, which is defined by a decreasing flow rate of the liquid feed at the end of a filling step.

The first and/or second liquid feed composition may be provided to a container at a particular peak flow rate. The peak flow rate of the second liquid feed composition may be greater than the peak flow rate of the first liquid feed composition. It may be desirable to have a relatively lower peak flow rate for the first liquid feed composition in order to be more precise with the amount of perfume ingredients provided, which are typically present at very low levels of active ingredient. It may be desirable to have a relatively greater peak flow rate for the second liquid feed composition in order to facilitate in situ mixing. The peak flow rate for the first and/or the second liquid feed composition may be from about 5 mL/second to about 10 L/second, or from about 25 mL/second to about 10 L/second, or from about 50 mL/second to about 10 L/second, or from about 100 mL/second to about 5 L/second. The peak flow rate for the first liquid feed composition may be from about 1 mL/second, or from about 5 mL/second, or from about 10 mL/second to about 100 mL/second, or to about 75 mL/second. The peak flow rate for the second liquid feed composition may be greater than 500 mL/second, or from about 500 mL/second to about 5 L/second, or from about 750 mL/second to about 2.5 L/second. The peak flow rate of the second liquid feed composition may be greater than the peak flow rate for the first liquid feed composition.

Some manufacturing systems may include a mixing station in addition to the filling stations. At such mixing stations, the container may be externally agitated (for example, by shaking, spinning, and/or tumbling the container) or internally agitated (for example, by stirring) in order to better homogenize the final product composition.

However, when the amounts and/or flow rates of the first and second liquid feed compositions are properly selected, the liquid consumer product may become adequately mixed in situ due to the mixing and momentum due to the addition process. Thus, the manufacturing system may not include a dedicated mixing station, and/or the process may not include a specific mixing step. The absence of such mixing stations or steps can save on capital and/or reduce manufacturing time. Despite the possible absence of a mixing station and/or a mixing step, it is understood that at least some mixing may occur when material is provided to the container, when the container moves on the manufacturing system (including stops and starts, if any), when the container is closed or sealed, and/or removed from the manufacturing system, for example to be placed on or in secondary packaging.

In order to minimize the error margin associated with the dynamic filling profile of the present invention, it may be desirable to control aeration in the compositions being provided to the container, for example at least the second liquid feed composition. A composition, for example the second liquid feed composition, may be characterized by an Aeration Level of 5% or less by volume, preferably of 3% or less by volume, more preferably of 2% or less by volume, and most preferably of 1% or less by volume. Preferably, aeration in the first liquid feed composition is also controlled in a similar manner.

Controlled aeration can be achieved prior to filling by placing the liquid feed compositions in de-aeration tanks for an extended period of time, either under atmospheric pressure or under vacuum conditions, so as to allow trapped air bubbles to be released from such liquid feed compositions. Quantification of aeration levels in the compositions is by way of a hydrometer assessing the specific gravity between aerated and un-aerated compositions under the atmospheric pressure.

Container

The process may include the step of providing a container. The container may have an interior space. The interior space may be characterized by a volume. The volume may be from about 100 mL to about 10 L, preferably from about 250 mL to about 5 L, more preferably from about 500 mL to about 2 L.

The container may be a rigid (e.g., self-supporting) container or a flexible container. The container may be in the form of a bottle or a bag, preferably a rigid bottle. The container may be made of any suitable plastic.

The container may have an opening through which the first and/or second feedstock are provided. The opening may be closeable. The process of the present disclosure may include closing the opening.

The opening may be selectively openable, for example by the operation of a press tap, a twist tap, or by removing a cap. The cap may be selectively attachable to the container and may snap or screw onto the container. The cap may be a dosing cap, which may be characterized by a volume of from about 25 mL to about 300 mL. The container and cap may form a container system.

The container system may further comprise a transition piece, typically located between the container and cap. The transition piece may facilitate attachment of the cap to the container, and/or may facilitate dispensing of the liquid composition, for example by being in the form of a spout. The process may further comprise a step of providing a transition piece to the container. The container, once filled and closed, may be suitable for vending to a consumer. The container may contain indicia related to branding/marketing information, usage information, safety information, or ornamentation. The indicia may be printed directly onto the container or may be on a label or sticker that is attached to the container. One or more containers may be placed into secondary packaging for transport and/or vending.

First Feedstock Composition

The processes of the present disclosure relate to a first feedstock composition. The first feedstock composition is a liquid and comprises perfume, among other components, as described in more detail below.

The first feedstock composition may be provided to the container, for example dispensed by a nozzle, which may be a first nozzle.

Because the macroemulsions of the first feedstock composition may be not very stable, it may be desirable to prepare the first feedstock composition and then use it shortly thereafter. For example, it may be that the first feedstock composition is prepared not more than about sixty minutes, preferably not more than about forty-five minutes, more preferably not more than about thirty minutes prior to providing the first feedstock composition to the container.

The first feedstock composition may be provided to the container at a filling rate of from about 10 mL/s to about 500 mL/s. The first feedstock composition may be provided during a filling time of from about 0.1 seconds to about 5 seconds. The first feedstock composition may be provided to the container in an amount of from about 1 mL to about 700 mL, or from about about 10 mL to about 500 mL, or from about 50 mL to about 300 mL, or from about 100 mL to about 300 mL. The first feedstock composition may be provided to the container in an amount of from about 1 gram to about 700 grams, or from about 10 grams to about 500 grams, or from about 50 grams to about 300 grams, or from about 100 grams to about 300 grams.

The first feedstock composition may comprise, or preferably be in the form of, an emulsion. The emulsion may be considered a macroemulsion by those of ordinary skill. The emulsion may be a water-in-oil emulsion, preferably a water-in-oil macroemulsion. The emulsion may comprise perfume, an emulsifying agent, and water, and optionally a solvent, as described in more detail below.

The emulsion may further include other ingredients suitable for inclusion in the final product, so long as they do not significantly or negatively impact the emulsion of the first feedstock composition. It may be preferred that the other ingredients contain low amounts of water and/or are non-aqueous. The other ingredients are preferably liquid ingredients, preferably substantially nonaqueous liquids. For example, the first feedstock composition may comprise dye. The dye may be provided to the container separate from the first feedstock composition, but prior to the provision of the second feedstock composition.

The first feedstock composition may comprise: (a) from about 30% to about 75%, preferably from about 40% to about 60%, more preferably about 45% to about 55%, by weight of the first feedstock composition, of the perfume; and/or (b) from about 0.1% to about 5%, by weight of the first feedstock composition, of the emulsifying agent; and/or (c) from about 40% to about 70%, by weight of the first feedstock composition, of the water, preferably at least two of (a), (b), and (c), more preferably each of (a), (b), and (c).

The first feedstock composition may be characterized by a viscosity of less than about 100 cps, or less than about 200 cps. The first feedstock composition may be characterized by a viscosity of from about 1 to about 100 cps. If the viscosity is too high, the perfume may not be adequately or evenly incorporated or dispersed in the final product composition due to incomplete mixing.

The processes of the present disclosure may include providing the first feedstock to the container in two or more addition steps. The two or more addition steps may occur concurrently or sequentially. For example, silicone may be provided to the container at the same time as the perfume (or perfume-containing emulsion). Dye may be added to the container before the perfume (or perfume-containing emulsion). A small amount of the second feedstock composition may even be added to the container prior to the addition of the perfume (or perfume-containing emulsion); an additional amount of the second feedstock composition may then be added after the first feedstock has been added.

A. Perfume

The first feedstocks of the present disclosure comprise perfume. The perfume can provide olfactory benefits to the final product composition and/or to surfaces or items treated with the product composition.

The perfume may comprise one or more perfume raw materials, typically a mixture of perfume raw materials. The term "perfume raw material" (or "PRM") as used herein refers to compounds having a molecular weight of at least about 100 g/mol and which are useful in imparting an odor, fragrance, essence, or scent, either alone or with other perfume raw materials. Typical PRMs comprise inter alia alcohols, ketones, aldehydes, esters, ethers, nitrites, and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994).

The PRMs may be characterized by their boiling points (B.P.) measured at the normal pressure (760 mm Hg), and their octanol/water partitioning coefficient (P), which may be described in terms of log P, determined according to the test method below. Based on these characteristics, the PRMs may be categorized as Quadrant I, Quadrant II, Quadrant III, or Quadrant IV perfumes, as described in more detail below. A perfume having a variety of PRMs from different quadrants may be desirable, for example, to provide fragrance benefits at different touchpoints during normal usage.

The perfume raw materials may comprise a perfume raw material selected from the group consisting of perfume raw materials having a boiling point (B.P.) lower than about 250° C. and a log P lower than about 3, perfume raw materials having a B.P. of greater than about 250° C. and a log P of greater than about 3, perfume raw materials having a B.P. of greater than about 250° C. and a log P lower than about 3, perfume raw materials having a B.P. lower than about 250° C. and a log P greater than about 3 and mixtures thereof. Perfume raw materials having a boiling point B.P. lower than about 250° C. and a log P lower than about 3 are known as Quadrant I perfume raw materials. Quadrant 1 perfume raw materials are preferably limited to less than 30% of the perfume composition. Perfume raw materials having a B.P. of greater than about 250° C. and a log P of greater than about 3 are known as Quadrant IV perfume raw materials, perfume raw materials having a B.P. of greater than about 250° C. and a log P lower than about 3 are known as Quadrant II perfume raw materials, and perfume raw materials having a B.P. lower than about 250° C. and a log P greater than about 3 are known as a Quadrant III perfume raw materials. Suitable Quadrant I, II, III and IV perfume raw materials are disclosed in U.S. Pat. No. 6,869,923.

The perfume may be relatively hydrophobic in nature. The perfume may comprise at least about 50%, preferably about 60%, by weight of the perfume, of perfume raw materials that are characterized by a log P of about 3.0 or greater. Log P is determined according to the test methods provided below.

The first feedstock composition may comprise: from about 30% to about 75%, preferably from about 40% to about 60%, more preferably about 45% to about 55%, by weight of the first feedstock composition, of the perfume. The level of perfume may be such that the liquid conditioning composition may comprise from about 0.1% to about 10%, or from about 0.1% to about 5%, by weight of the liquid conditioning composition, of perfume provided by the first feedstock composition.

B. Emulsifying Agent

The first feedstocks of the present disclosure comprise one or more emulsifying agents. The emulsifying agent helps to emulsify the perfume and/or other ingredients, making them easier to incorporate into stable final product compositions. Further, it is believed that proper selection of the type and/or amount of emulsifying agent(s) influence the type of emulsion formed, which influences the ease of incorporation into the final product composition.

The first feedstock composition may comprise from about 0.1% to about 5%, by weight of the first feedstock composition, of the emulsifying agent. It may be preferred to limit the amount of emulsifying agent to a relatively low amount so as to facilitate the formation of a macroemulsion. Furthermore, excess surfactant, for example anionic or nonionic surfactant, is not typically desired in a liquid conditioning composition, as it does little to improve the performance during typical usage.

The weight ratio of the perfume to the emulsifying agent in the first feedstock composition is at least 5:1, preferably at least 10:1, more preferably from about 10:1 to about 50:1. A relatively high ratio of perfume to emulsifying agent facilitates the first feedstock composition being in the form of a water-in-oil macroemulsion.

The emulsifying agent may be characterized by an HLB value of from about 5 to about 10. Preferably, the differences of the HLB value of the perfume and the HLB value of the emulsifying agent is no more than about 4, preferably no more than about 3. Without wishing to be bound by theory, it is believed that selecting such HLB values contributes to the formation of a suitable water-in-oil emulsion that can be easily incorporated to form a liquid conditioning composition.

The emulsifying agent may comprise a surfactant, preferably a nonionic surfactant, more preferably a mixture of nonionic surfactants. It is believed that mixtures of nonionic surfactant emulsifiers can facilitate improved perfume incorporation into the final product.

Suitable nonionic surfactants may include alkoxylated alkyl alcohols, alkoxylated alkyl phenols, sorbitan esters, ethoxylated sorbitan esters, or mixtures thereof.

Suitable nonionic surfactants may be selected from ethoxylated alcohols and ethoxylated alkyl phenols of the formula $R(OC2H4)_nOH$, wherein R is selected from the group consisting of aliphatic hydrocarbon radicals containing from about 8 to about 15 carbon atoms and alkyl phenyl radicals in which the alkyl groups contain from about 8 to about 12 carbon atoms, and the average value of n is from about 5 to about 15.

Other suitable nonionic surfactant may include sorbitan esters (preferably sorbitan monoesters), ethoxylated sorbitan esters (preferably ethoxylated sorbitan monoesters), or mixtures thereof. Suitable sorbitan esters may include sorbitan monolaurate, sorbitan monopalmitate, sorbitan monostearate, sorbitan monooleate, sorbitan sesquioleate, sorbitan trioleate, sorbitan isostearate, or mixtures thereof. Suitable ethoxylated sorbitan esters (also called "sorbates") may include PEG-20 sorbitan monolaurate (where "PEG" means polyethylene glycol, and "20" indicates the total number of ethoxylate groups per sorbitan monolaurate group on a molar basis), PEG-4 sorbitan monolaurate, PEG-20 sorbitan monopalmitate, PEG-20 sorbitan monostearate, PEG-4 sorbitan monostearate, PEG-20 sorbitan tristearate, PEG-20 sorbitan monooleate, or mixtures thereof. Preferred mixtures may include a sorbitan ester and an ethoxylated sorbitan ester. Sorbitan esters may be sold under the SPAN tradename, and ethoxylated sorbitan esters may be sold under the TWEEN tradename, both available from Sigma Aldrich.

Other non-limiting examples of nonionic surfactants useful herein include: C8-C18 alkyl ethoxylates, such as, NEODOL® nonionic surfactants from Shell; C6-C12 alkyl phenol alkoxylates where the alkoxylate units may be ethyleneoxy units, propyleneoxy units, or a mixture thereof; C12-C18 alcohol and C6-C12 alkyl phenol condensates with ethylene oxide/propylene oxide block polymers such as Pluronic® from BASF; C14-C22 mid-chain branched alcohols, BA; C14-C22 mid-chain branched alkyl alkoxylates, BAEX, wherein x is from 1 to 30; alkylpolysaccharides; specifically alkylpolyglycosides; polyhydroxy fatty acid amides; and ether capped poly(oxyalkylated) alcohol surfactants. Specific example include C11-C15 EO12 and C11-C15 EO9 Tergitol® nonionic surfactants from Dow, C12-C15 EO7 and C14-C15 EO7 NEODOL® nonionic surfactants from Shell, C12-C14 EO7 and C12-C14 EO9 Surfonic® nonionic surfactants from Huntsman. Other suitable nonionic surfactants are the condensation products of Guerbet alcohols with from 2 to 18 moles, preferably 2 to 15, more preferably 5-9 of ethylene oxide per mole of alcohol. Suitable nonionic surfactants include those with the trade name Lutensol® from BASF. Lutensol XP-50 is a Guerbet ethoxylate that contains 5 ethoxy groups. Lutensol XP-80 and containing 8 ethoxy groups. Other suitable non-ionic surfactants for use herein include fatty alcohol polyglycol ethers, alkylpolyglucosides and fatty acid glucamides, and/or alkylpolyglucosides based on Guerbet alcohols.

The one or more emulsifiers may comprise linear emulsifiers, branched emulsifiers, or mixtures thereof, preferably linear nonionic surfactants, branched nonionic surfactants, or mixtures thereof.

Particular examples of nonionic surfactants that may be suitable are provided below in Table A. The first feedstock composition may comprise one or more of the nonionic surfactants provided in Table A.

TABLE A

| Product Trade Name | Supplier | Chemical Identity | Reported HLB |
|---|---|---|---|
| Span 20 | Sigma Aldrich | Sorbitan monolaurate | 8.6 |
| Span 40 | Sigma Aldrich | Sorbitan monopalmitate | 6.7 |
| Span 60 | Sigma Aldrich | Sorbitan monostearate | 4.7 |
| Span 80 | Sigma Aldrich | Sorbitan monooleate | 4.3 |
| Span 83 | Sigma Aldrich | Sorbitan sesquioleate | 3.7 |
| Span 85 | Sigma Aldrich | Sorbitan trioleate | 1.8 |
| Span 120 | Sigma Aldrich | Sorbitan isostearate | 4.7 |
| Tween 20 | Sigma Aldrich | PEG-20 sorbitan monolaurate | 16.7 |
| Tween 21 | Sigma Aldrich | PEG-4 sorbitan monolaurate | 13.3 |
| Tween 40 | Sigma Aldrich | PEG-20 sorbitan monopalmitate | 15.6 |
| Tween 60 | Sigma Aldrich | PEG-20 sorbitan monostearate | 14.9 |
| Tween 61 | Sigma Aldrich | PEG-4 sorbitan monostearate | 9.6 |
| Tween 65 | Sigma Aldrich | PEG-20 sorbitan tristearate | 10.5 |
| Tween 80 | Sigma Aldrich | PEG-20 sorbitan monooleate | 15.0 |
| Ecosurf EH3 | Dow | Alcohol Ethoxylate (2-Ethyl hexanol EO-PO nonionic surfactant) | 7.9 |
| Ecosurf EH6 | Dow | Alcohol Ethoxylate (2-Ethyl hexanol EO-PO nonionic surfactant) | 10.8 |
| Ecosurf EH9 | Dow | Alcohol Ethoxylate (2-Ethyl hexanol EO-PO nonionic surfactant) | 12.5 |
| Tergitol 15S7 | Dow | Nonionic secondary alcohol ethoxylate | 12.1 |
| Tergitol 15S20 | Dow | Nonionic secondary alcohol ethoxylate | 16.3 |
| Tergitol 15S30 | Dow | Nonionic secondary alcohol ethoxylate | 17.4 |
| Tergitol L61 | Dow | Ethylene oxide/propylene oxide nonionic surfactant | 3 |

TABLE A-continued

| Product Trade Name | Supplier | Chemical Identity | Reported HLB |
|---|---|---|---|
| Tergitol L62 | Dow | Ethylene oxide/propylene oxide nonionic surfactant | 7 |
| Tergitol L64 | Dow | Ethylene oxide/propylene oxide nonionic surfactant | 15 |
| Lutensol XL 70 | BASF | Alkyl polyethylene glycol ether | about 13 |
| Neodol 91-8 | Shell | Alcohol ethoxylate | 13.7 |
| CAE10 | Norchem | Alcohol ethoxylate | N/A |
| Glucopon 215 | BASF | Alkyl polyglucoside | N/A |

C. Water

The first feedstock composition comprises water. It is believed that the presence of at least some water in the first feedstock composition helps to facilitate dispersion of the perfume in the final product composition, for example when a water-in-oil emulsion undergoes a phase inversion during addition of the second feedstock composition.

The first feedstock composition may comprise from about 40% to about 70%, by weight of the first feedstock composition, of water.

The weight ratio of perfume to water in the first feedstock composition may be from about 1.5:1 to about 1:1.5, preferably about 1.2:1 to about 1:1.2, more preferably about 1:1. Such ratios of perfume to water can facilitate the first feedstock composition being in the form of a water-in-oil macroemulsion.

D. Methods of Making the Emulsion

The first feedstock composition may be made by combining the perfume, the emulsifying agent, and the water, and then mixing to form an emulsion. For example, to make a water-in-oil emulsion, the water phase, which can further include surfactants or solvents, may be added to perfume, which can also include surfactant or solvents, while mixing. The addition step may be performed relatively slowly, for example by taking longer than 30 seconds. Addition of surfactant or solvent to the water or to the perfume oil is done separately under mixing. The mixing step(s) may be by any suitable process, including dynamic mixing (e.g., in a batch process), static mixing (e.g., in an in-line process and/or a continuous loop mixing process), or combinations thereof.

In order to achieve the desired particle size and/or to save energy costs, the amount of mixing energy delivered and/or shear to the ingredients of the first feedstock composition may be relatively limited. For example, the ingredients of the first feedstock composition may be combined and mixed with a rotor stator with tip speed of up to 16.5 m/s in 130 g; or with a mixing energy of from tip speed 2.5 m/s in 100 g to about 16.5 m/s 130 g.

The first feedstock composition, which may be in the form of an emulsion, preferably a macroemulsion, may be somewhat unstable. For example, after a brief period of storage, the first feedstock composition may show phase separation. For example, after mixing and initially appearing homogenous, the first feedstock composition may show physical phase separation after about twenty minutes, or after about fifteen minutes, or after about ten minutes, or even after about five minutes of storage at room temperature (e.g., about 22° C.). Without wishing to be bound by theory, it is believed that such phase instability may be advantageous to effective incorporation into the product compositions.

Second Feedstock Composition

The processes of the present disclosure relate to a second feedstock composition. The second feedstock composition is typically a liquid, is a base composition of the liquid conditioning composition, and may comprise a conditioning compound, as described in more detail below.

The second feedstock composition may be provided to the container, for example dispensed by a nozzle, which may be a second nozzle.

The second feedstock composition may be provided to the container concurrently with and/or subsequently to providing at least a portion of the first feedstock composition to the interior space of the container. The second feedstock composition may be provided to the interior space of the container subsequent to the first feedstock composition being provided to the interior space. The step of providing the first feedstock composition to the container may be complete before the step of providing the second feedstock composition to the container begins.

The process may include the steps of: dispensing the first feedstock composition at a first location, for example from a first nozzle; moving the container from the first location to a second location; and dispensing the second feedstock composition at the second location, for example from a second nozzle.

The process may include providing the second feedstock composition to the container not more than 120 seconds, preferably not more than 90 second, more preferably not more than 60 seconds, even more preferably not more than 30 seconds, after the first feedstock composition is provided to the container. Shorter time periods between the filling steps can improve the speed of production and minimize opportunities for the first feedstock composition to phase split.

The second feedstock composition may be provided to the container at a filling rate of from about 50 mL/s to about 10 L/s. The second feedstock composition may be provided during a filling time of from about 0.5 seconds to about 10 seconds. The second feedstock composition may be provided to the container in an amount of from about 100 mL to about 10 L, or from about 200 mL to about 5 L, or from about 500 mL to about 2 L. The amount added will depend on the total volume of the container.

The amount of the second feedstock composition may be greater than the amount of first feedstock composition in terms of the relative amounts provided to the container. The first feedstock composition and the second feedstock composition may be provided to the container in a weight ratio of from about 1:10 to about 1:100, preferably from about 1:10 to about 1:50. A greater amount of second feedstock composition can facilitate adequate mixing of the first feedstock composition and improved stability in the final product.

The second feedstock composition may be added to the container in one or more steps, preferably in one step. After the second feedstock composition has been added to the composition, further ingredients may be added to finish and/or differentiate the composition. For example, additional perfume or dye may be added with the second feedstock composition, or before or after the second feedstock composition has been added.

A. Conditioning Compound

The second feedstock composition may comprise a conditioning compound. The conditioning compound may be present in the second feedstock composition in an amount of from about 1% to about 50%, by weight of the second feedstock composition.

Conditioning compounds may provide softness, anti-wrinkle, anti-static, conditioning, anti-stretch, color, and/or appearance benefits to target fabrics. The conditioning compound may be selected from the group consisting of quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, glyceride copolymers, or combinations thereof.

The composition may include a quaternary ammonium ester compound, a silicone, or combinations thereof, preferably a combination. The combined total amount of quaternary ammonium ester compound and silicone may be from about 5% to about 70%, or from about 6% to about 50%, or from about 7% to about 40%, or from about 10% to about 30%, or from about 15% to about 25%, by weight of the composition. The composition may include a quaternary ammonium ester compound and silicone in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1.

The compositions of the present disclosure may comprise a quaternary ammonium ester compound as a conditioning compound. The quaternary ammonium ester compound (sometimes referred to as "ester quats") may be present at a level of from about 2% to about 40%, or from about 3% to about 25%, preferably from 4% to 18%, more preferably from 5% to 15%, by weight of the composition. Preferably, the iodine value (see Methods) of the parent fatty acid from which the quaternary ammonium fabric compound is formed is from 0 to about 90, or from about 10 to about 70, or from about 15 to about 50, or from about 18 to about 30. The iodine value may be from about 25 to 50, preferably from 30 to 48, more preferably from 32 to 45. Without being bound by theory, lower melting points resulting in easier processability of the conditioning compound are obtained when the parent fatty acid from which the quaternary ammonium compound is formed is at least partially unsaturated. In particular, double unsaturated fatty acids enable easy-to-process conditioning compounds. In preferred liquid fabric softener compositions, the parent fatty acid from which the quaternary ammonium conditioning actives is formed comprises from 2.0% to 20.0%, preferably from 3.0% to 15.0%, more preferably from 4.0% to 15.0% of double unsaturated C18 chains ("C18:2") by weight of total fatty acid chains (see Methods). On the other hand, very high levels of unsaturated fatty acid chains are to be avoided to minimize malodour formation as a result of oxidation of the fabric softener composition over time.

The quaternary ammonium ester compound may be present at a level of from greater than 0% to about 30%, or from about 1% to about 25%, or from about 3% to about 20%, or from about 4.0% to 18%, more preferably from 4.5% to 15%, even more preferably from 5.0% to 12% by weight of the composition. The level of quaternary ammonium ester compound may depend of the desired concentration of total fabric conditioning active in the composition (diluted or concentrated composition) and of the presence or not of other conditioning compounds. However, the risk on increasing viscosities over time is typically higher in fabric treatment compositions with higher conditioning compound levels. On the other hand, at very high conditioning compound levels, the viscosity may no longer be sufficiently controlled which renders the product unfit for use.

Suitable quaternary ammonium ester compounds include but are not limited to, materials selected from the group consisting of monoester quats, diester quats, triester quats and mixtures thereof. Preferably, the level of monoester quat is from 2.0% to 40.0%, the level of diester quat is from 40.0% to 98.0%, the level of triester quat is from 0.0% to 25.0% by weight of total quaternary ammonium ester compound.

The quaternary ammonium ester compound may comprise compounds of the following formula:

$$\{R^2_{(4-m)}—N+—[X—Y—R^1]_m\}A^-$$

wherein:

m is 1, 2 or 3 with proviso that the value of each m is identical;

each $R^1$ is independently hydrocarbyl, or branched hydrocarbyl group, preferably $R^1$ is linear, more preferably $R^1$ is partially unsaturated linear alkyl chain;

each $R^2$ is independently a $C_1$-$C_3$ alkyl or hydroxyalkyl group, preferably $R^2$ is selected from methyl, ethyl, propyl, hydroxyethyl, 2-hydroxypropyl, 1-methyl-2-hydroxyethyl, poly(C2-C3 alkoxy), polyethoxy, benzyl;

each X is independently $—(CH_2)n-$, $—CH_2—CH(CH_3)—$ or $—CH—(CH_3)—CH_2—$ and each n is independently 1, 2, 3 or 4, preferably each n is 2;

each Y is independently —O—(O)C— or —C(O)—O—;

A—is independently selected from the group consisting of chloride, methyl sulfate, and ethyl sulfate, preferably $A^-$ is selected from the group consisting of chloride and methyl sulfate, more preferably A—is methyl sulfate;

with the proviso that when Y is —O—(O)C—, the sum of carbons in each $R^1$ is from 13 to 21, preferably from 13 to 19. Preferably, X is $—CH_2—CH(CH_3)—$ or $—CH—(CH_3)—CH_2—$ to improve the hydrolytic stability of the quaternary ammonium ester compound, and hence further improve the stability of the fabric treatment composition.

Examples of suitable quaternary ammonium ester compounds are commercially available from Evonik under the tradename Rewoquat WE18, and/or Rewoquat WE20, and/or from Stepan under the tradename Stepantex GA90, Stepantex VK90, and/or Stepantex VL90A.

The fabric conditioning compositions of the present disclosure may comprise silicone as a conditioning compound. Suitable levels of silicone may comprise from about 0.1% to about 70%, or from about 0.3% to about 40%, or from about 0.5% to about 30%, alternatively from about 1% to about 20% by weight of the composition.

Useful silicones can be any suitable silicone-comprising compound. The silicone polymer may be selected from the group consisting of cyclic silicones, polydimethylsiloxanes, aminosilicones, cationic silicones, silicone polyethers, silicone resins, silicone urethanes, and mixtures thereof. The silicone may comprise a polydialkylsilicone, such as a polydimethyl silicone (polydimethyl siloxane or "PDMS"), or a derivative thereof. The silicone may comprise an aminofunctional silicone, amino-polyether silicone, alkyloxylated silicone, cationic silicone, ethoxylated silicone, propoxylated silicone, ethoxylated/propoxylated silicone, quaternary silicone, or combinations thereof. The silicone may comprise a polydimethyl silicone, an aminosilicone, or a combination thereof, preferably an aminosilicone.

The silicone may comprise a random or blocky organosilicone polymer. The silicone may be provided as an emulsion.

The silicone may be characterized by a relatively high molecular weight. A suitable way to describe the molecular weight of a silicone includes describing its viscosity. A high molecular weight silicone may be one having a viscosity of from about 10 cSt to about 3,000,000 cSt, or from about 100 cSt to about 1,000,000 cSt, or from about 1,000 cSt to about 600,000 cSt, or even from about 6,000 cSt to about 300,000 cSt.

The composition may comprise glyceride copolymers. The glyceride copolymers may be derived from natural oils. Examples of natural oils include, but are not limited to, vegetable oils, algae oils, fish oils, animal fats, tall oils, derivatives of these oils, combinations of any of these oils, and the like. Representative non-limiting examples of vegetable oils include low erucic acid rapeseed oil (canola oil), high erucic acid rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil, preferably canola oil. Representative non-limiting examples of animal fats include lard, tallow, poultry fat, yellow grease, and fish oil. Tall oils are by-products of wood pulp manufacture. The glyceride copolymers may be metathesized unsaturated polyol esters.

B. Water

The second feedstock composition may comprise water, for example from about 99% to about 40%, or from about 94% to about 50%, or from about 90% to about 60%, by weight of the second feedstock composition, of water.

C. Adjunct Ingredients

The second feedstock compositions of the present disclosure may comprise other adjunct ingredients. The adjunct ingredients may be selected to provide, for example, processing, stability, and/or performance benefits.

Suitable consumer product adjunct materials may include: surfactants, conditioning actives, deposition aids, rheology modifiers or structurants, bleach systems, stabilizers, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, silicones, hueing agents, aesthetic dyes, additional perfumes and perfume delivery systems, structure elasticizing agents, carriers, hydrotropes, processing aids, structurants, anti-agglomeration agents, coatings, formaldehyde scavengers, and/or pigments.

Depending on the intended form, formulation, and/or end-use, compositions of the present disclosure or may not may not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids, structurants, anti-agglomeration agents, coatings, formaldehyde scavengers and/or pigments.

The precise nature of these additional components, and levels of incorporation thereof, will depend on the physical form of the composition and the nature of the operation for which the resulting composition is to be used. However, when one or more adjuncts are present, such one or more adjuncts may be present as detailed below. The following is a non-limiting list of adjunct ingredients that may be useful.

1. Rheology Modifier/Structurant

The second feedstock compositions of the present disclosure may contain a rheology modifier and/or a structurant. Rheology modifiers may be used to "thicken" or "thin" liquid compositions to a desired viscosity. Structurants may be used to facilitate phase stability and/or to suspend or inhibit aggregation of particles in liquid composition, such as the encapsulates as described herein.

Suitable rheology modifiers and/or structurants may include non-polymeric crystalline hydroxyl functional structurants (including those based on hydrogenated castor oil), polymeric structuring agents, cellulosic fibers (for example, microfibrillated cellulose, which may be derived from a bacterial, fungal, or plant origin, including from wood), di-amido gellants, or combinations thereof.

Polymeric structuring agents may be naturally derived or synthetic in origin. Naturally derived polymeric structurants may comprise hydroxyethyl cellulose, hydrophobically modified hydroxyethyl cellulose, carboxymethyl cellulose, polysaccharide derivatives and mixtures thereof. Polysaccharide derivatives may comprise pectine, alginate, arabinogalactan (gum Arabic), carrageenan, gellan gum, xanthan gum, guar gum and mixtures thereof. Synthetic polymeric structurants may comprise polycarboxylates, polyacrylates, hydrophobically modified ethoxylated urethanes, hydrophobically modified non-ionic polyols and mixtures thereof. Polycarboxylate polymers may comprise a polyacrylate, polymethacrylate or mixtures thereof. Polyacrylates may comprise a copolymer of unsaturated mono- or di-carbonic acid and C1-C30 alkyl ester of the (meth)acrylic acid. Such copolymers are available from Noveon Inc. under the tradename Carbopol Aqua 30. Another suitable structurant is sold under the tradename Rheovis CDE, available from BASF.

2. Cationic Polymer

The second feedstock compositions of the present disclosure may comprise a cationic polymer in addition to the cationically substituted polyether glucans (and a cationic fabric softening active, if present) described above. Cationic polymers may serve as deposition aids, e.g., facilitating improved deposition efficiency of softening and/or freshness actives onto a target surface. Additionally or alternatively, cationic polymers may provide stability, structuring, and/or rheology benefits to the composition.

The second feedstock composition may comprise, by weight of the composition, from 0.0001% to 3%, preferably from 0.0005% to 2%, more preferably from 0.001% to 1%, or from about 0.01% to about 0.5%, or from about 0.05% to about 0.3%, of a cationic polymer.

Cationic polymers in general and their methods of manufacture are known in the literature. Suitable cationic polymers may include quaternary ammonium polymers known the "Polyquaternium" polymers, as designated by the International Nomenclature for Cosmetic Ingredients, such as Polyquaternium-6 (poly(diallyldimethylammonium chloride), Polyquaternium-7 (copolymer of acrylamide and diallyldimethylammonium chloride), Polyquaternium-10 (quaternized hydroxyethyl cellulose), Polyquaternium-22 (copolymer of acrylic acid and diallyldimethylammonium chloride), and the like.

The cationic polymer may comprise a cationic polysaccharide, such as cationic starch, cationic cellulose, cationic guar, a cationic chitosan, or mixtures thereof. The cationic cellulose may comprise a quaternized hydroxyethyl cellulose. Polymers derived from polysaccharides may be preferred, being naturally derived and/or sustainable materials.

The cationic polymer may comprise a cationic acrylate. The cationic polymer may comprise cationic monomers, nonionic monomers, and optionally anionic monomers (so long as the overall charge of the polymer is still cationic. The cationic polymer may comprise cationic monomers selected from the group consisting of methyl chloride quaternized dimethyl aminoethylammonium acrylate, methyl chloride quaternized dimethyl aminoethylammonium methacrylate and mixtures thereof. The cationic polymer may comprise nonionic monomers selected from the group consisting of acrylamide, dimethyl acrylamide and mixtures thereof. The cationic polymer may optionally comprise anionic monomers selected from acrylic acid, methacrylic acid, itaconic acid, crotonic acid, maleic acid, fumaric acid, as well as monomers performing a sulfonic acid or phosphonic acid functions, such as 2-acrylamido-2-methyl propane sulfonic acid (ATBS), and their salts.

The cationic polymer may substantially linear or may be cross-linked. The composition may comprise both a substantially linear cationic polymer (e.g., formed with less than 50 ppm cross-linking agent) and a cross-linked cationic polymer (e.g., formed with greater than 50 ppm cross-linking agent). Such combinations may provide both depositions and structuring benefits.

3. Surfactant

The second feedstock composition may include less than 5%, or less than 2%, or less than 1%, or less than about 0.1%, by weight of the composition, of anionic surfactant, or even be substantially free of anionic surfactant. Anionic surfactants can negatively impact the stability and/or performance of the present compositions, as they may undesirably interact with cationic components such as the conditioning compounds. Product compositions intended to be added during the rinse cycle of an automatic washing machine, such as a liquid fabric enhancer, may include relatively low levels of anionic surfactant. Additionally or alternatively, compositions intended to be used in combination with a detergent composition during the wash cycle of an automatic washing machine may include relatively low levels of anionic surfactant.

The second feedstock composition may comprise nonionic surfactant. Such surfactants may provide, for example, stability and/or processing benefits. The nonionic surfactants may be emulsifiers, for example, of perfume. The nonionic surfactants may be alkoxylated fatty alcohols, such as ethoxylated C10-C18 fatty alcohols.

4. Perfume Delivery System

The second feedstock composition may comprise a perfume delivery system. Such systems may improve the performance of perfumes by increasing deposition efficiency, facilitating perfume release at different touchpoints, and/or increasing longevity of perfume performance.

The perfume delivery system may comprise encapsulates, for example, where a core is surrounded by wall material; the core may comprise perfume and optionally a partitioning modifier (e.g., isopropyl myristate). The wall material may comprise: melamine, polyacrylamide, silicones, silica, polystyrene, polyurea, polyurethanes, polyacrylate based materials, polyacrylate esters based materials, gelatin, styrene malic anhydride, polyamides, aromatic alcohols, polyvinyl alcohol, or mixtures thereof. The melamine wall material may comprise melamine crosslinked with formaldehyde, melamine-dimethoxyethanol crosslinked with formaldehyde, and mixtures thereof; encapsulates with such wall materials may be used in combination with a formaldehyde scavenger, such as acetoacetamide, urea, or derivatives thereof. The polyacrylate based wall materials may comprise polyacrylate formed from methylmethacrylate/dimethylaminomethyl methacrylate, polyacrylate formed from amine acrylate and/or methacrylate and strong acid, polyacrylate formed from carboxylic acid acrylate and/or methacrylate monomer and strong base, polyacrylate formed from an amine acrylate and/or methacrylate monomer and a carboxylic acid acrylate and/or carboxylic acid methacrylate monomer, and mixtures thereof.

The encapsulates may be coated with a deposition aid, a cationic polymer, a non-ionic polymer, an anionic polymer, or mixtures thereof. Suitable polymers may be selected from the group consisting of: polyvinylformaldehyde, partially hydroxylated polyvinylformaldehyde, polyvinylamine, polyethyleneimine, ethoxylated polyethyleneimine, polyvinylalcohol, polyacrylates, a polysaccharide (e.g., chitosan), and combinations thereof.

The perfume delivery system may comprise particles that comprise a graft copolymer and a fragrance material, where the graft copolymer comprises a polyalkylene glycol (e.g., polyethylene glycol) as a graft base and one or more side chains that comprise vinyl acetate moieties.

The perfume delivery system may comprise a pro-perfume, for example a siloxane-based pro-perfume, where a perfume raw material is associated with (for example, via covalent bonding) a polymer (e.g., a siloxane polymer) upon delivery to a surface and is released upon or after treatment of a surface with the composition.

When the perfume delivery system includes formaldehyde derivatives, such as perfume encapsulates with melamine-formaldehyde shells, the composition may further comprise a formaldehyde scavenger, which may comprise a sulfur-based formaldehyde scavenger, a non-sulfur-based formaldehyde scavenger, or mixtures thereof. Suitable non-sulfur-based formaldehyde scavengers may include urea, ethylene urea, acetoacetamide, or mixtures thereof. Suitable sulfur-based formaldehyde scavengers may include alkali and/or alkali earth metal dithionites, pyrosulfites, sulfites, bisulfites, metasulfites, monoalkyl sulphites, dialkyl sulphites, dialkylene sulphites, sulfides, thiosulfates, thiocyanates, mercaptans, thiourea, and mixtures thereof.

The second feedstock composition may comprise an antimicrobial agent. The antimicrobial agent may comprise a diphenyl ether antimicrobial agent, preferably 4-4'-dichloro-2-hydroxydiphenyl ether, 2,4,4'-trichloro-2'-hydroxydiphenyl ether, or combinations thereof. The antimicrobial agent may comprise a quaternary ammonium antimicrobial agent, preferably dialkyl quaternary ammonium antimicrobial agents. Suitable antimicrobial agents may include those sold under the TINOSAN and/or BARQUAT tradenames.

Liquid Conditioning Composition

The processes of the present disclosure are useful for making liquid conditioning compositions. The liquid conditioning composition may be a liquid fabric enhancer or a hair conditioner, preferably a liquid fabric enhancer.

The liquid conditioning composition may have a viscosity from about 1 to about 2000 centipoise (1-2000 mPa·s), or from about 50 to about 1400 centipoise (50-1400 mPa·s), or from about 50 to about 1000 centipoise (50-1000 mPa·s), or from about 50 to about 800 centipoise (50-800 mPa·s), or from about 50 to about 500 centipoise (50-500 mPa·s), or from about 100 to about 200 centipoise (100-200 mPa·s). The liquid conditioning composition formed by the process may be characterized by a viscosity (at 10 $s^{-1}$) of from about 50 to about 500 mPa·s, or from about 75 to about 300 mPa·s, or from about 80 to about 150 mPa·s. The viscosity is determined using a Brookfield viscometer, No. 2 spindle, at 60 RPM/s, measured at 20° C.

The liquid conditioning composition may comprise from about 1% to about 35%, by weight of the composition, of the conditioning compound. The liquid conditioning composition may comprise from about 1% to about 25%, or from about 1% to about 20%, or from about 1% to about 15%, or from about 1% to about 12%, or from about 1% to about 10%, or from about 2% to about 10%, or from about 2% to about 8%, by weight of the composition, of the conditioning compound.

The fabric care compositions of the present disclosure may be characterized by a pH of from about 2 to about 12, or from about 2 to about 8.5, or from about 2 to about 7, or from about 2 to about 5. The compositions of the present disclosure may have a pH of from about 2 to about 4, preferably a pH of from about 2 to about 3.7, more preferably a pH from about 2 to about 3.5, preferably in the form of an aqueous liquid. It is believed that such pH levels facilitate stability of the conditioning compound, e.g., a quaternary ammonium ester compound. The pH of a composition is determined by dissolving/dispersing the composition in deionized water to form a solution at 10% concentration, at about 20° C.

Plurality of Liquid Conditioning Compositions

The present disclosure also relates to a method of making a plurality of liquid conditioning compositions. For example, the method may relate to repeating the steps described above to make a plurality of liquid consumer products (e.g., a first liquid consumer product and a second liquid consumer product) that have the same formulation in each container. The containers may be of the same size, or of different sizes.

Figure 2:
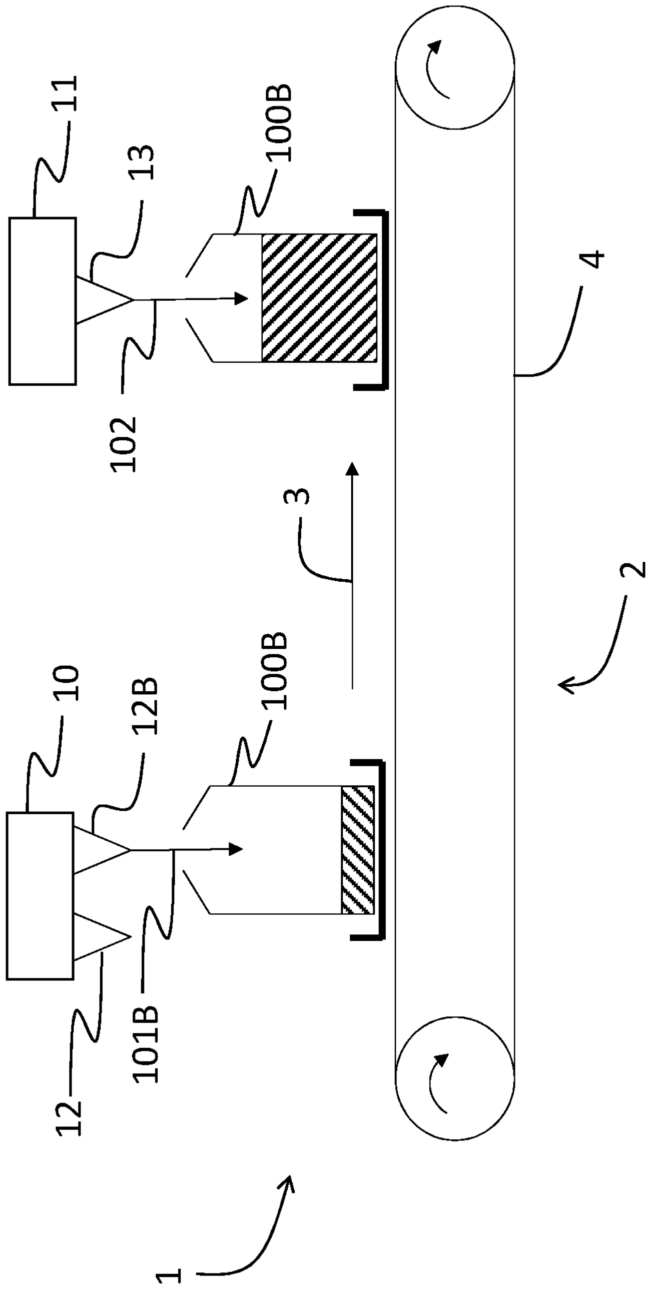
FIG. 2 shows an exemplary manufacturing system as described in the present disclosure, which may be particularly useful for making a plurality of compositions having different formulations.

The present disclosure also contemplates a method of making a plurality of liquid conditioning compositions, where a first conditioning composition is different than a second conditioning composition. As substantially shown in FIG. 1, the method may include providing first and second liquid feed compositions 101, 102, to a container 100, which may be a first container, to make a first liquid conditioning composition. As shown in FIG. 2, the method may also include providing an alternate first liquid feed composition 101B and a second liquid feed 102 composition to a container, which may be a second container 100B, to make a second liquid conditioning composition that has a different formulation than the first liquid conditioning composition. The alternate first liquid feed composition 101B may have a different formula than the first liquid feed composition, for example different perfume type(s), different perfume levels, different first adjunct types, different adjunct levels, and/or different water levels. The second liquid feed composition 102 may be the same for both the first and second liquid conditioning composition.

Alternatively, the first liquid feed composition may be the same for both the first and the second liquid conditioning compositions, but the second liquid feed compositions may be different (e.g., a second liquid feed composition and an alternate second liquid feed composition). Thus, the method may include providing first and second liquid feed compositions to a container, which may be a first container, to make a first liquid conditioning composition. The method may also include providing the first liquid feed composition and an alternate second liquid feed composition to a container, which may be a second container, to make a second liquid conditioning composition that has a different formulation than the first liquid conditioning composition. The alternate second liquid feed composition may have a different formula than the second liquid feed composition, for example different adjunct types, different adjunct levels, and/or different water levels. The difference may include a second adjunct, different conditioning compound types and/or levels.

Different nozzles, 12 and 12B, may be used to dispense the first and alternate first liquid feed compositions 101, 101B. Different nozzles, which may be located at the same filling station 10 or at different filling stations, may be used to dispense the second and alternate second liquid feed compositions. Such configurations allow multiple types of products to be made on the same manufacturing line without the need for clean-out between product types.

Method of Using a Fabric Conditioning Composition

The present disclosure further relates to methods of using a fabric conditioning composition. For example, the present disclosure relates to methods of treating a fabric with a composition according to the present disclosure. Such methods may provide conditioning and/or freshening benefits.

The method may include a step of contacting a fabric with a fabric conditioning composition of the present disclosure. The composition may be in neat form or diluted in a liquor, for example, a wash or rinse liquor. The composition may be diluted in water prior, during, or after contacting the surface or article. The fabric may be optionally washed and/or rinsed before and/or after the contacting step. The composition may be applied directly onto a fabric or provided to a dispensing vessel or drum of an automatic laundry machine.

The method of treating a fabric may include the steps of: (a) optionally washing, rinsing and/or drying the fabric; (b) contacting the fabric with a fabric conditioning composition as described herein, optionally in the presence of water; (c) optionally washing and/or rinsing the fabric; and (d) optionally drying, whether passively and/or via an active method such as a laundry dryer. The method may occur during the wash cycle or the rinse cycle, preferably the rinse cycle, of an automatic washing machine. The fabric may be treated by a wash cycle and then followed by one or more rinse cycles.

For purposes of the present disclosure, treatment may include but is not limited to, scrubbing and/or mechanical agitation. The fabric may comprise most any fabric capable of being laundered or treated in normal consumer use conditions.

Liquors that comprise the disclosed compositions may have a pH of from about 3 to about 11.5. When diluted, such compositions are typically employed at concentrations of from about 500 ppm to about 15,000 ppm in solution. When the wash solvent is water, the water temperature typically ranges from about 5° C. to about 90° C. and, the water to fabric ratio may be typically from about 1:1 to about 30:1.

The fabric may be contacted with an anionic surfactant, optionally in the presence of water, prior to being contacted with the conditioning composition. The fabric may comprise anionic surfactant that is residual from a washing step. The source of the anionic surfactant may be a detergent composition, such as a heavy-duty liquid laundry detergent, a water-soluble pouch comprising a detergent composition, or a powdered laundry detergent. The detergent composition may further comprise suitable detergent adjuncts. For example, the detergent composition may further comprise cellulase enzyme, fatty acids and/or salts thereof, or mixtures thereof.

The anionic surfactant and/or source thereof (e.g., the detergent composition) may be diluted with water in a vessel, such as the drum of an automatic washing machine, to form a wash liquor; the wash liquor may contact the fabric. The method may further comprise removing the wash liquor from the vessel after contacting the fabric, but prior to the fabric being contacted with the conditioning composition.

The conditioning composition may be diluted with water, optionally in a vessel such as an automatic washing machine, to make a rinse liquor. The rinse liquor may comprise anionic surfactant and/or cellulase enzymes, which may be residual or carried-over from a wash cycle. The rinse liquor may be removed from the vessel. The fabric may be dried by any suitable process, such as in an automatic dryer, or by line drying.

The water that is part of the wash liquor and/or the rinse liquor may be characterized by a certain hardness. For example, the water may be characterized by having less than 12 gpg, or less than 10 gpg, of hardness. It is believed that lower levels of hardness can lead to better performance compared to processes that occur in higher levels of hardness.

Combinations

Specifically contemplated combinations of the disclosure are herein described in the following lettered paragraphs. These combinations are intended to be illustrative in nature and are not intended to be limiting.

A. A process for making a liquid conditioning composition, the process comprising the steps of: providing a container with an interior space having a volume of from about 100 mL to about 10 L; providing a first feedstock composition to the interior space of the container, wherein the first feedstock composition comprises an emulsion, the emulsion comprising perfume, an emulsifying agent, and water, wherein the weight ratio of the perfume to the emulsifying agent is at least 5:1; and providing a second feedstock composition to the interior space of the container, wherein the second feedstock composition comprises a quaternary ammonium alkyl compound, wherein providing the second feedstock composition occurs concurrently and/or subsequently to providing at least a portion of the first feedstock composition to the interior space of the container.

B. The process according to paragraph A, wherein the second feedstock composition is provided to the interior space of the container subsequent to the first feedstock composition being provided to the interior space.

C. The process according to any of paragraphs A or B, wherein the weight ratio of the perfume to the emulsifying agent is at least 10:1, preferably from about 10:1 to about 50:1.

D. The process according to any of paragraphs A-C, wherein the weight ratio of the perfume to the water in the first feedstock composition is from about 1.5:1 to about 1:1.5, preferably about 1.2:1 to about 1:1.2, more preferably about 1:1.

E. The process according to any of paragraphs A-D, wherein the perfume is characterized by at least one of the following: (a) an HLB value of from about 4 to about 12; and/or (b) the perfume comprises at least about 50%, preferably about 60%, by weight of the perfume, of perfume raw materials that are characterized by a C log P of about 3.0 or greater.

F. The process according to any of paragraphs A-E, wherein the emulsifying agent is characterized by an HLB value of from about 5 to about 10, preferably wherein the differences of the HLB value of the perfume and the HLB value of the emulsifying agent is no more than about 4, preferably no more than about 3.

G. The process according to any of paragraphs A-F, wherein the emulsifying agent comprises at least one nonionic surfactant, preferably at least one nonionic surfactant selected from the group consisting of alkoxylated alkyl alcohols, alkoxylated alkyl phenols, sorbitan esters, ethoxylated sorbitan esters, and mixtures thereof, more preferably at least one nonionic surfactant selected from the group consisting of sorbitan esters, ethoxylated sorbitan esters, and mixtures thereof.

H. The process according to any of paragraphs A-G, wherein the quaternary ammonium alkyl compound is a quaternary ammonium alkyl ester compound, preferably derived from fatty acids having C16-C18 alkyl chains, more preferably wherein the quaternary ammonium alkyl ester compound and/or the fatty acids from which it is derived is characterized by an Iodine Value of from 0 to about 90, or from about 10 to about 70, or from about 15 to about 50, or from about 18 to about 30.

I. The process according to any of paragraphs A-H, wherein the first feedstock composition comprises: (a) from about 30% to about 75%, preferably from about 40% to about 60%, more preferably about 45% to about 55%, by weight of the first feedstock composition, of the perfume; and/or (b) from about 0.1% to about 5%, by weight of the first feedstock composition, of the emulsifying agent; and/or (c) from about 40% to about 70%, by weight of the first feedstock composition, of the water.

J. The process according to any of paragraphs A-I, wherein the liquid conditioning composition formed by the process comprises from about 1% to about 5%, by weight of the liquid conditioning composition, of perfume.

K. The process according to any of paragraphs A-J, wherein the liquid conditioning composition formed by the process comprises water at a level of from about 60 wt % to about 98 wt %, by weight of the liquid conditioning composition.

L. The process according to any of paragraphs A-K, wherein the liquid conditioning composition formed by the process is characterized by a viscosity (at 10 $s^{-1}$) of from about 50 to about 500 mPa·s, or from about 75 to about 300 mPa·s, or from about 80 to about 150 mPa·s.

M. The process according to any of paragraphs A-L, wherein the liquid conditioning composition formed by the process is characterized by a pH of from about 1 to about 5, preferably from about 2 to about 4, wherein the pH is determined by dissolving or dispersing the liquid conditioning composition in deionized water to form a solution at 10% concentration, at about 20° C.

N. The process according to any of paragraphs A-M, wherein the liquid conditioning composition formed by the process further comprises one or more adjuncts selected from the group consisting of structurant, cationic polymer, surfactant, perfume delivery system, or mixtures thereof, wherein the one or more adjuncts are added as part of the second feedstock composition or at least one other feedstock composition.

O. The process according to any of paragraphs A-N, wherein: the first feedstock composition is dispensed from a first nozzle at a first location; the container is moved from the first location to a second location; and the second feedstock composition is dispensed from a second nozzle at the second location.

P. The process according to any of paragraphs A-O, wherein the first feedstock composition is prepared not more than sixty minutes prior to providing the first feedstock composition to the container.

Q. The process according to any of paragraphs A-Q, wherein the second feedstock composition is provided to the container not more than 120 seconds after the first feedstock composition is provided to the container.

R. The process according to any of paragraphs A-Q, wherein the second composition is provided to the container at a filling rate of from about from about 50 mL/s to about 10 L/s.

S. The process according to any of paragraphs A-R, wherein the weight ratio of the first feedstock composition and the second feedstock composition as provided to the container is from about 1:5 to about 1:50.

T. The process according to any of paragraphs A-S, wherein the liquid conditioning composition is a liquid fabric enhancer.

U. The process according to any of paragraphs A-T, wherein the container is a first container comprising a first interior space, and the liquid conditioning composition is a first liquid conditioning composition; the process further comprising: providing a second container comprising a second interior space having a volume of from about 100 mL to about 10 L; providing a third feedstock composition to the second interior space of the second container, wherein the third feedstock composition comprises an emulsion, the emulsion comprising perfume, an emulsifying agent, and water, wherein the weight ratio of the perfume to the emulsifying agent is at least 5:1, and wherein the perfume of the third feedstock composition is different than the perfume of the first feedstock composition; providing the second feedstock composition to the second interior space of the second container, resulting in a second liquid conditioning composition.

Test Methods

Determination of HLB Value

Nonionic surfactants can be classified by the balance between the hydrophilic and lipophilic moieties in the surfactant molecule. The hydrophile-lipophile balance (HLB) scale devised by Griffin in 1949 is a scale from 0-20 (20 being Hydrophilic) used to characterize the nature of surfactants. The HLB of a surfactant may be calculated as follows:

$$HLB=20*Mh/M$$

where Mh is the molecular of the hydrophilic portion of the molecule, and M is the molecular mass of the whole molecule, giving a result on a scale of 0 to 20. An HLB value of 0 corresponds to a completely lipophilic/hydrophobic molecule, and a value of 20 corresponds to a completely hydrophilic/lipophobic molecule. See Griffin, W. C. Calculation of HLB values of Nonionic Surfactants, J. Soc. Cosmet. Chem. 1954, 5, 249-256. The HLB values for commonly-used surfactants are readily available in the literature (e.g., HLB Index in McCutcheon's Emulsifiers and Detergents, MC Publishing Co., 2004). The HLB value for a mixture of surfactants can be calculated as a weighted average of the HLB values of the surfactants.

Determination of log P Value

The log P of a material or mixture of materials is determined according to the following method(s), and according to the following hierarchy:

For single materials and/or simple mixtures:

Use the Consensus log P when possible (for example, when a known, simple material).

If Consensus log P is not available, then use Classic log P if possible.

If Classic log P is not available, then use Measured log P if possible.

For other mixtures (for example, more complex mixtures or essential oils/extracts):

Use the Composite log P when possible.

If Consensus log P is not available, then use the Mixture Measurement log P as described below.

As used herein, "log P" refers to the value provided when the hierarchy above and the methods below are followed.

The degree of hydrophobicity of a perfume ingredient can be correlated with its octanol/water partitioning coefficient P. The octanol/water partitioning coefficient of a perfume ingredient is the ratio between its equilibrium concentration in octanol and in water. A perfume ingredient with a greater partitioning coefficient P is more hydrophobic. Conversely, a perfume ingredient with a smaller partitioning coefficient P is more hydrophilic. Since the partitioning coefficients of the perfume ingredients normally have high values, they are more conveniently given in the form of their logarithm to the base 10, log P.

This model computes the octanol-water partition coefficient (log P or log Kow) for general organic molecules based directly on molecular structure. Log P is a measure of the distribution of a solute between two immiscible liquid phases, octanol and water, and is generally used as a relative measure of the hydrophobicity of a solute. It is computed in this instance using the ACD/Labs Log P module. This release is based on Version 14.02 (Linux) of the ACD/Labs module acdlabs.com.

Three algorithms are employed for computing log P: 1) Classic algorithm, 2) GALAS algorithm, and 3) the Consensus algorithm. The Classic method is essentially what it sounds like, a classic style of log P calculation based on molecular fragments. It works well and is broadly applicable. The GALAS algorithm is a new method that essentially starts with the Classic value, and then adjusts the value based on experimental data it has for that molecule or for very similar molecules in its large supporting database. So, the GALAS method can be very accurate if the molecule or very similar molecules are in the underlying database. The Consensus method is a weighted combination of the Classic and GALAS values. It takes into account the degree of reliability of the GALAS result, which reflects the similarity of the query structure to the molecules it found in the database. If the GALAS method is more reliable, then the Consensus method will give it more weight, otherwise the Consensus value will be closer to the Classic value. It is recommended that the Consensus values be used for general purposes because while the Classic algorithm produces good values, the GALAS algorithm can yield more accurate values if there are sufficient examples of similar structures in the underlying module database to provide adjustments. However, the since the query can be unique, the GALAS values may not be as accurate. The Consensus method combines the Classic and GALAS values using an adaptive weighting scheme that takes into account the reliability index associated with the GALAS value. Thus, the Consensus method should provide the best overall single value for log P. All three values are reported in the output that this model provides so that users can be made aware of the differences between the three, and make an informed choice on which value to use. The ACD/lab Log P predictions included in the table below are the Consensus algorithm. The C log P values, which are the most reliable and widely used estimates for this physicochemical property, are used instead of the experimental log P values in the selection of perfume ingredients which are useful in the present invention.

Measured Log p:

The identity and quantity of each perfume raw material (PRM) in a test composition is determined via liquid analysis of straight perfume oil or dilutions of the perfume oil using the analytical chromatography technique of Gas Chromatography Mass Spectrometry with Flame Ionization Detection (GC-MS/FID), conducted using a non-polar or slightly-polar column.

Suitable instruments for conducting these GC-MS/FID analyses includes equipment such as: Hewlett Packard/Agilent Gas Chromatograph model 7890 series GC/FID (Hewlett Packard/Agilent Technologies Inc., Santa Clara, California, U.S.A.); Hewlett Packard/Agilent Model 5977N Mass Selective Detector (MSD) transmission quadrupole mass spectrometer (Hewlett Packard/Agilent Technologies Inc., Santa Clara, California, U.S.A.); Multipurpose AutoSampler MPS2 (GERSTEL Inc., Linthicum, Maryland, U.S.A.); and 5%-Phenyl-methylpolysiloxane Column J&W DB-5 (30 m length×0.25 mm internal diameter×0.25 μm film thickness) (J&W Scientific/Agilent Technologies Inc., Santa Clara, California, U.S.A.).

One skilled in the art will understand that in order to identify and quantify the PRMs in a composition, the analytical steps may involve: the use of external reference standards; and generation of area response values; and the comparison of measured results against retention times and mass spectra peaks obtained from reference databases and libraries.

The log P of the perfume oil composite is performed is a multi-step process of identification, determination of relative abundance, and Log P database prediction. The weight percent of each PRM is calculated by the FID area response of that PRM divided by the total FID area response of all PRMs. The log P of each individual material is determined by the using the Consensus value of the ACD/log p predictive method. The reported composite Log P is calculated by multiplying the individual PRM weight fraction by its respective log P for all PRMs then summing the total.

In the perfume art, some auxiliary materials having no odor, or a low odor, are used, e.g., as solvents, diluents, extenders or fixatives. Non-limiting examples of these materials are ethyl alcohol, ethanol, carbitol, dipropylene glycol, diethyl phthalate, triethyl citrate, isopropyl myristate, and benzyl benzoate. These materials are used for, e.g., solubilizing or diluting some solid or viscous perfume ingredients to, e.g., improve handling and/or formulating. These materials are useful in the perfume composition, and they are counted in the calculation of the definition/formulation of the perfume compositions for the composite log P of the present invention. A sample calculation is provided below.

| Fragrance material | wt % | LogP Consensus | weighted LogP |
|---|---|---|---|
| alpha Thuyene | 0.195 | 4.064 | 0.008 |
| alpha Pinene | 1.060 | 4.138 | 0.044 |
| beta Pinene | 1.179 | 3.925 | 0.046 |
| 1,8 Cineole | 1.320 | 2.854 | 0.038 |
| d-Limonene | 1.850 | 4.403 | 0.081 |
| Camphor | 0.855 | 2.490 | 0.021 |
| Linalool | 83.903 | 3.285 | 2.756 |
| Terpinen-4-ol | 0.563 | 3.073 | 0.017 |
| Terpineol | 4.987 | 3.036 | 0.151 |
| Linalool trans-oxide | 1.060 | 2.089 | 0.022 |
| Geraniol | 2.510 | 3.409 | 0.086 |
| Nerol | 0.519 | 3.409 | 0.018 |
| | | | Composite logP = 3.29 |

When hydrophilic perfume is desired, at least about 25% by weight of the perfume, more preferably about 50%, most preferably about 75%, is composed of perfume ingredients having a C log P of about 2.5 or smaller.

Method of Measuring Iodine Value of a Quaternary Ammonium Ester Compound

The iodine value of a quaternary ammonium ester fabric compound is the iodine value of the parent fatty acid from which the fabric conditioning active is formed, and is defined as the number of grams of iodine which react with 100 grams of parent fatty acid from which the fabric conditioning active is formed.

First, the quaternary ammonium ester compound is hydrolysed according to the following protocol: 25 g of fabric treatment composition is mixed with 50 mL of water and 0.3 mL of sodium hydroxide (50% activity). This mixture is boiled for at least an hour on a hotplate while avoiding that the mixture dries out. After an hour, the mixture is allowed to cool down and the pH is adjusted to neutral (pH between 6 and 8) with sulfuric acid 25% using pH strips or a calibrated pH electrode.

Next the fatty acid is extracted from the mixture via acidified liquid-liquid extraction with hexane or petroleum ether: the sample mixture is diluted with water/ethanol (1:1) to 160 mL in an extraction cylinder, 5 grams of sodium chloride, 0.3 mL of sulfuric acid (25% activity) and 50 mL of hexane are added. The cylinder is stoppered and shaken for at least 1 minute. Next, the cylinder is left to rest until 2 layers are formed. The top layer containing the fatty acid in hexane is transferred to another recipient. The hexane is then evaporated using a hotplate leaving behind the extracted fatty acid.

Next, the iodine value of the parent fatty acid from which the fabric conditioning active is formed is determined following ISO3961:2013. The method for calculating the iodine value of a parent fatty acid comprises dissolving a prescribed amount (from 0.1-3 g) into 15 mL of chloroform. The dissolved parent fatty acid is then reacted with 25 mL of iodine monochloride in acetic acid solution (0.1M). To this, 20 mL of 10% potassium iodide solution and 150 mL deionised water is added. After the addition of the halogen has taken place, the excess of iodine monochloride is determined by titration with sodium thiosulphate solution (0.1M) in the presence of a blue starch indicator powder. At the same time a blank is determined with the same quantity of reagents and under the same conditions. The difference between the volume of sodium thiosulphate used in the blank and that used in the reaction with the parent fatty acid enables the iodine value to be calculated.

Method of Measuring Fatty Acid Chain Length Distribution

The fatty acid chain length distribution of the quaternary ammonium ester fabric conditioning active refers to the chain length distribution of the parent fatty acid from which the fabric conditioning active is formed. It can be measured on the quaternary ammonium ester conditioning active or on the fatty acid extracted from the fabric softener composition as described in the method to determine the iodine value of a quaternary ammonium ester fabric conditioning active. The fatty acid chain length distribution is measured by dissolving 0.2 g of the quaternary ammonium ester conditioning active or extracted fatty acid in 3 mL of 2-butanol, 3 glass beads are added and the sample is vortexed at high speed for 4 minutes. An aliquot of this extract is then transferred into a 2 mL gas chromatography vial, which is then injected into the gas chromatogram inlet (250° C.) of the gas chromatograph (Agilent GC6890N) and the resultant bi-products are separated on a DB-5 ms column (30 m×250 μm×1.0 μm, 2.0 mL/min). These bi-products are identified using a mass-spectrometer (Agilent MSD5973N, Chemstation Software version E.02.02) and the peak areas of the corresponding fatty acid chain lengths are measured. The fatty acid chain length distribution is determined by the relative ratios of the peak areas corresponding to each fatty acid chain length of interest as compared to the sum of all peaks corresponding to all fatty acid chain lengths.

EXAMPLES

The examples provided below are intended to be illustrative in nature and are not intended to be limiting.

Example 1. Exemplary Emulsifying Agents and First Feedstock Compositions

Exemplary first feedstock compositions according to the present disclosure may be made by emulsifying perfume with the emulsifying agents shown in Table 1. The general levels in the perfume composition are as follows: perfume raw materials, 50%; total emulsifying agent, 1-5% (having surfactants present in the following ratios); water, 45-50%.

After sufficient mixing, most of the resulting first feedstock compositions are water-in-oil emulsions, unless indicated with an asterisk (*).

TABLE 1

| | Surfactant type and ratio | | | | HLB of |
|---|---|---|---|---|---|
| Emuls. Agent # | Surf 1 | Surf 1 wt % | Surf 2 | Surf 2 wt % | Emuls. Agent |
| 1* | Tween 20 | 100 | none | — | 16.7 |
| 2* | Tween 65 | 100 | none | — | 10.5 |
| 3* | Span 80 | 100 | none | — | 4.3 |
| 4 | Tween 20 | 50 | Span 80 | 50 | 10.5 |
| 5 | Tween 20 | 40 | Span 85 | 60 | 7.76 |
| 6 | Tween 20 | 30 | Span 80 | 70 | 8.02 |
| 7 | Tween 20 | 15 | Span 80 | 85 | 6.16 |
| 8 | Tween 40 | 40 | Span 85 | 60 | 7.32 |
| 9 | Tween 40 | 15 | Span 40 | 85 | 8.04 |
| 10 | Tween 40 | 15 | Span 80 | 85 | 6 |
| 11 | Tween 65 | 50 | Span 20 | 50 | 9.55 |
| 12 | Tween 65 | 50 | Span 85 | 50 | 6.15 |
| 13 | Tween 65 | 30 | Span 80 | 70 | 6.16 |
| 14 | Tween 80 | 30 | Span 85 | 70 | 5.76 |
| 15 | Tween 80 | 20 | Span 80 | 80 | 6.44 |
| 16 | Tween 80 | 20 | Span 85 | 80 | 4.44 |
| 17 | Tween 80 | 15 | Span 40 | 85 | 7.95 |
| 18 | Tergitol L62 | 85 | Tergitol L64 | 15 | 8.2 |
| 19 | Tergitol L61 | 85 | Tergitol L64 | 15 | 4.8 |

*leads to oil-in-water emulsion

Example 2. Exemplary Liquid Conditioning Compositions

Various liquid conditioning compositions are made according to the following procedure. A perfume water-in-oil emulsion, as indicated below in Table 2, is provided to a bottle. A base composition comprising 11% of a cationic conditioning agent (an alkyl diester quat), 87.5% water, and minors (e.g., solvent, salt, chelant, acidifying agent, and/or antifoam) is then added to the bottle. The number of the Emulsifying Agent in Table 2 relates to which surfactant mixture from Example 1, above, is used to make the perfume emulsion. The Emulsion wt % and Base Composition wt % are provided by weight of the final product composition.

TABLE 2

| | Emulsion | | | |
|---|---|---|---|---|
| Leg | Emulsifying Agent (HLB) (# from Table 1 above) | Emulsion wt % | Base Composition wt % | Result (stability assessed visually after 24 hours) |
| 1 | # 6 (HLB = 8.0) | 7 | 93 | Suitable final product |
| 2 | # 16 (HLB = 4.4) | 7 | 93 | Suitable final product |
| 3 | # 18 (HLB = 8.2) | 7 | 93 | Suitable final product, although not as stable as Legs 1 and 2 (perfume layer on top and white spots on the side of the bottle are visible) |
| 4 | # 19 (HLB = 4.8) | 7 | 93 | Suitable final product, although not as stable as Legs 1 and 2 (perfume layer on top and white spots on the side of the bottle are visible) |

As shown by the results in Table 2, suitable final products with adequate stability can be formed by mixing first and second feedstock compositions according to the present disclosure in a bottle.

Example 3. Compositions Made from Comparative Perfume Emulsions

Liquid conditioning compositions are made by providing a perfume emulsion to a container, and then a base composition. Characteristics and results are shown below in Table 3. Where a combination of emulsifying agents is used, the HLB of the combination is provided. Stability of the emulsion is determined by visual homogeneous emulsion (e.g., appears as a single phase, with no visual droplets or multiple layers). Whether or not the resulting product composition passes or fails is determined by visually inspecting for a homogenous product (e.g., one color, no white traces, no perfume droplets or perfume layers visible).

TABLE 3

| Leg | Emulsifying Agent (surfactant type/ratio) | HLB of Emulsifying Agent | Emulsion Type | Emulsion Stability | Resulting Product Composition |
|---|---|---|---|---|---|
| 1 | Span 80 (100%) | 4.3 | Water-in-oil | Unstable | Fail |
| 2 | Span 80 (85%)/ Tween 80 (15%) | 6 | Water-in-oil | Unstable | Pass |
| 3 | Span 80 (70%)/ Tween 80 (30%) | 7.5 | Water-in-oil | Unstable | Pass |
| 4 | Tween 20 (100%) | 16.7 | Oil-in-water | Stable | Fail |
| 5 | Tergitol L62 (85%)/ Tergitol L64 (15%) | 8.2 | Water-in-oil | Unstable | Fail |
| 6 | Tergitol L61 (85%)/ Tergitol L64 (15%) | 4.8 | Water-in-oil | Unstable | Fail |

As shown by the results in Table 3, certain emulsifying agents are more likely to provide stable final products than others. For example, Legs 2 and 3 have mixtures of surfactants as emulsifying agents and provide stable final products, whereas Legs 1 and 4 use single surfactants and provide unstable final products.

It is also notable that the emulsion of Leg 3 is determined to be unstable, yet the final product is stable; on the other hand, the emulsion of Leg 4 is stable, yet provides an unstable final product.

The results in Table 3 also indicate that surfactant selection can make a difference. For example, mixtures of the Span and Tween surfactants (Legs 2 and 3) can provide stable final products, whereas certain mixtures of certain Tergitol surfactants (Legs 5 and 6) provide unstable final products.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for making a liquid conditioning composition, the process comprising the steps of:
- providing a container with an interior space having a volume of from about 100 mL to about 10 L;
- providing a first feedstock composition to the interior space of the container,
  - wherein the first feedstock composition comprises an emulsion,
    - the emulsion comprising perfume, an emulsifying agent, and water; and
- providing a second feedstock composition to the interior space of the container,
  - wherein the second feedstock composition comprises a quaternary ammonium alkyl compound,
  - wherein providing the second feedstock composition occurs concurrently and/or subsequently to providing at least a portion of the first feedstock composition to the interior space of the container,
- wherein the second feedstock composition is provided to the container at a filling rate of from 500 mL/s to 10 L/s; and
- wherein a peak flow rate of the second feedstock composition is greater than a peak flow rate of the first feedstock composition; and
- wherein the weight ratio of the perfume to the emulsifying agent in the first feedstock composition is at least 10:1, and
- wherein the emulsifying agent is characterized by an HLB value of from 5 to 10; and
- wherein the difference of the HLB value of the perfume and the HLB value of the emulsifying agent in the first feedstock composition is no more than 4; and
- wherein the perfume comprises at least 50%, by weight of the perfume, of perfume raw materials that are characterized by a ClogP of about 3.0 or greater; and
- wherein the resulting liquid conditioning composition is stable through being mixed in situ and without undergoing any additional mixing steps.

2. The process according to claim 1, wherein the weight ratio of the perfume to the water in the first feedstock composition is from 1.5:1 to 1:1.5.

3. The process according to claim 1, wherein the perfume is characterized by an HLB value of from 4 to 12.

4. The process according to claim 1, wherein the emulsifying agent comprises at least one nonionic surfactant selected from the group consisting of alkoxylated alkyl alcohols, alkoxylated alkyl phenols, sorbitan esters, ethoxylated sorbitan esters, and mixtures thereof.

5. The process according to claim 1, wherein the quaternary ammonium alkyl compound is a quaternary ammonium alkyl ester compound derived from fatty acids having C16-C18 alkyl chains,
- wherein the quaternary ammonium alkyl ester compound and/or the fatty acids from which it is derived is characterized by an Iodine Value of from 0 to 90.

6. The process according to claim 1, wherein the first feedstock composition comprises from 30% to 75%, by weight of the first feedstock composition, of the perfume.

7. The process according to claim 1, wherein the first feedstock composition comprises from 0.1% to 5%, by weight of the first feedstock composition, of the emulsifying agent.

8. The process according to claim 1, wherein the first feedstock composition comprises from 40% to 70%, by weight of the first feedstock composition, of the water.

9. The process according to claim 1, wherein the liquid conditioning composition formed by the process further comprises one or more adjuncts selected from the group consisting of structurant, cationic polymer, surfactant, perfume delivery system, or mixtures thereof,
- wherein the one or more adjuncts are added as part of the second feedstock composition or as part of at least one other feedstock composition.

10. The process according to claim 1, wherein:
- the first feedstock composition is dispensed from a first nozzle at a first location;
- the container is moved from the first location to a second location; and
- the second feedstock composition is dispensed from a second nozzle at the second location.

11. The process according to claim 1, wherein the second feedstock composition is provided to the container not more than 120 seconds after the first feedstock composition is provided to the container.

12. The process according to claim 1, wherein the weight ratio of the first feedstock composition and the second feedstock composition as provided to the container is from 1:5 to 1:50.

13. The process according to claim 1, wherein the liquid conditioning composition is a liquid fabric enhancer.

14. The process according to claim 1, wherein the container is a first container comprising a first interior space, and the liquid conditioning composition is a first liquid conditioning composition;

the process further comprising:

providing a second container comprising a second interior space having a volume of from 100 mL to 10 L;

providing a third feedstock composition to the second interior space of the second container, wherein the third feedstock composition comprises an emulsion, the emulsion comprising perfume, an emulsifying agent, and water, wherein the weight ratio of the perfume to the emulsifying agent is at least 5:1, and wherein the perfume of the third feedstock composition is different than the perfume of the first feedstock composition;

providing the second feedstock composition to the second interior space of the second container, resulting in a second liquid conditioning composition.

15. The process according to claim 1, wherein the second feedstock composition is provided to the container at a filling rate of from 500 mL/s to 5 L/s.

* * * * *